United States Patent
Pintsov

(10) Patent No.: US 7,895,130 B2
(45) Date of Patent: Feb. 22, 2011

(54) METHOD FOR TRACKING AND NOTIFICATION OR RECIPIENT-INITIATED MAIL ITEMS

(75) Inventor: Leon A. Pintsov, West Hartford, CT (US)

(73) Assignee: Pitney Bowes Inc., Stamford, CT (US)

( * ) Notice: Subject to any disclaimer, the term of this patent is extended or adjusted under 35 U.S.C. 154(b) by 2470 days.

(21) Appl. No.: 10/770,000

(22) Filed: Feb. 2, 2004

(65) Prior Publication Data
US 2004/0199656 A1 Oct. 7, 2004

Related U.S. Application Data

(60) Provisional application No. 60/460,583, filed on Apr. 4, 2003.

(51) Int. Cl.
*G06Q 30/00* (2006.01)
*G06Q 10/00* (2006.01)

(52) U.S. Cl. ........................ 705/330; 705/1.1

(58) Field of Classification Search .................. 705/1.1, 705/330–333
See application file for complete search history.

(56) References Cited

U.S. PATENT DOCUMENTS

| | | | | |
|---|---|---|---|---|
| 6,612,489 | B2 * | 9/2003 | McCormick et al. | 235/382 |
| 7,222,087 | B1 * | 5/2007 | Bezos et al. | 705/26 |
| 2002/0032612 | A1 * | 3/2002 | Williams et al. | 705/26 |
| 2003/0004816 | A1 * | 1/2003 | Byers et al. | 705/26 |
| 2003/0050874 | A1 * | 3/2003 | Sesek et al. | 705/29 |
| 2003/0204452 | A1 * | 10/2003 | Wheeler | 705/28 |
| 2004/0044588 | A1 * | 3/2004 | Smith et al. | 705/27 |
| 2004/0153379 | A1 * | 8/2004 | Joyce et al. | 705/28 |
| 2004/0202154 | A1 * | 10/2004 | Aklepi et al. | 370/352 |
| 2004/0243279 | A1 * | 12/2004 | Boden et al. | 700/214 |
| 2005/0197892 | A1 * | 9/2005 | Bilibin et al. | 705/13 |
| 2006/0074774 | A1 * | 4/2006 | Estes et al. | 705/26 |
| 2007/0276708 | A1 * | 11/2007 | Steury et al. | 705/5 |

OTHER PUBLICATIONS

Carbone, Jim, "Purchasing tools for the Internet toolbox", Dec. 11, 1997, Purchasing, vol. 123, No. 9, pp. S26(4).*

* cited by examiner

*Primary Examiner*—Fadey S Jabr
(74) *Attorney, Agent, or Firm*—Brian A. Lemm; Charles R. Malandra, Jr.

(57) ABSTRACT

A method in which the creation of identifier information is done by the recipient in a convenient fashion and communicated to the mailer. A recipient, such as a business or consumer who orders mail items of value, i.e., merchandise, documents, etc., from a mailer would give the mailer the recipient's electronic address and the recipient's delivery and handling preferences for the ordered merchandise. The electronic address and delivery and handling preferences of the recipient may be given to the mailer in plain language or in codified or encrypted form. This invention takes into account recipient's desires and preferences by entering information about the recipient's desires and preferences into a computerized actionable form.

14 Claims, 4 Drawing Sheets

METHOD FOR TRACKING AND NOTIFICATION OR RECIPIENT-INITIATED MAIL ITEMS

This Application claims the benefit of the filing date of U.S. Provisional Application No. 60/460,583 filed Apr. 4, 2003, which is owned by the assignee of the present Application.

FIELD OF THE INVENTION

The present invention relates to mailing and logistics systems and more particularly to mailing and logistics systems that the recipient selects the manner in which the delivered mail item will be processed.

BACKGROUND OF THE INVENTION

In mail communication and logistic systems dedicated to distribution of physical items, there is frequently a problem regarding the monitoring of progress of items inducted into the system. Physical items that are deposited into distribution and delivery systems are referred to herein as "mail items". Mail items may be letters, flats, packages, irregularly-shaped objects or any other physical items that are capable of being mailed within security and size constraints imposed by carrier systems. Such systems may be created and managed by public (Posts) or private (FedEx, DHL, UPS) entities are referred to herein as carrier distribution system or carrier systems.

Primary parties involved with carrier systems are mailer (sender), carrier (e.g., Post), recipient and sometimes several independent third parties that provide services to any of the primary three parties involved in mail communication system. Examples of third parties include mail contractors that provide mail creation or finishing services for mailers, quality of service monitoring parties, legal authorities called upon for dispute resolution between primary parties and other parties that perform auxiliary functions to creation, distribution and delivery of physical items. It should also be noted that in some implementations, certain functions of the carrier can be performed by other parties such as trusted suppliers or subcontractors. In this case, the carrier, for example may outsource all data processing activities associated with processing and providing track and trace information to mailers, recipients and other parties.

Mailers and recipients frequently require knowledge of the location of the mailed item at any given moment in time during the process of its distribution. Such locations could be any intermediate points along the distribution route or final delivery point. The information about location of mailed items can have a broad variety of uses including planning of operations, supply chain management, cash flow management etc. The system of providing such information is known by the name of "track and trace" and is employed by most carriers in the industrial world. The term "track" normally refers to the process of finding the location of a given mail item at a given moment in time when the item is believed to be under the system's control and is progressing through the system in the expected and predictable manner, while the term "trace" usually implies the process of finding the last known location of the (potentially) lost mail item. In any case, the service of "track and trace" involves three basic components and their associated processes.

The first process is the creation and application to the mail item of a unique and machine-readable mail item identifier.

The second process is the capturing of the mail item identifier information at different (normally) pre-defined points along the mail item distribution route within the carrier system including the point of delivery (either in a pre-determined receptacle that allows access to the mail item to the intended recipient (e.g., mail box or post office box) or directly into the hands of such recipient). Capturing information at different points is normally referred to as "events" in the life cycle of the mail item. Events are defined as "significant" happenings in the life cycle of the item whereby the term "significant" implies importance of the happening to any of the primary or auxiliary parties involved in the mail item creation, processing and delivery. Examples of the events significant for the carrier are the handing over of the item from the carrier facility to a transportation unit or from a carrier to another entity such as Governmental Customs Offices. Events significant to the mailer are, for example, the attempted delivery of the mail item to the recipient or the induction of the mail item into the carrier system. Events are normally codified and accompanied by additional informational elements known as "attributes". Typical attributes of an event are its codified location and time stamp. Capturing the mail item identifier, events and its attributes is one of the important functions of the carrier.

The third process is providing access to events/attributes information to all interested parties, primarily to mailers and recipients.

The process of track and trace has evolved over the years and has been driven by private carriers desire to keep their customers informed while simultaneously upgrading the carrier's own management control system and service monitoring. As a result, all traditional track and trace systems evolved to be reasonable and economically effective systems for carriers, and cumbersome and not user-friendly systems for mailers and recipients. Specifically, in all traditional cases, the first step of creating a track and trace identifier for mail items involves the creation of the identifier information by a carrier and communication of such information to the mailer.

At the time the identifier information is created, it is unknown to the recipient and, thus, must be communicated to the recipient in a separate communication step in order to provide the intended recipient with the means of accessing track and trace information from the carrier. Furthermore, traditional methods of accessing track and trace information for mailers and recipients are also cumbersome and inconvenient. For example, in most of the cases, the recipient is notified by a physical post card about significant events (such as arrival of the mail item at carrier's delivery facility) or, in a more modern method, both the mailer and the recipient may have access to track and trace information through a carrier-maintained web site (typically data base of events and attributes). The latter method requires a significant amount of access management effort including password management and the like.

One of the problems of the prior art is that existing systems are inconvenient for the customer and economically inefficient, thus making useful services cumbersome to access and costly to use.

Another problem of the prior art is that existing systems preferences and access to delivery information are either unknown or ignored at the time of mail item creation.

SUMMARY OF THE INVENTION

This invention overcomes the disadvantages of the prior art by providing a method in which the creation of identifier information is done by the recipient in a convenient fashion and communicated to the mailer. A recipient such as a business or consumer who orders mail items of value, i.e., merchandise, documents, etc., from a mailer would give the mailer the recipient's electronic address and the recipient's delivery and handling preferences for the ordered merchandise. The electronic address and delivery and handling preferences of the recipient may be given to the mailer in plain language or in codified or encrypted form. This invention takes into account recipient's desires and preferences by entering information about the recipient's desires and preferences into a computerized actionable form.

The foregoing also simplifies the process of managing identifiers in order to avoid possible identifier collisions that would occur if the identifiers are created independently by mailers.

An additional advantage of this invention is that all other parties, i.e., mailer, carrier, and third parties involved in the transaction, are completely relieved of the necessity to create and manage identifiers for mail items produced according to the present invention. The recipient is the party who creates the identifier.

DETAILED DESCRIPTION OF THE PREFERRED EMBODIMENT

Figure 1:
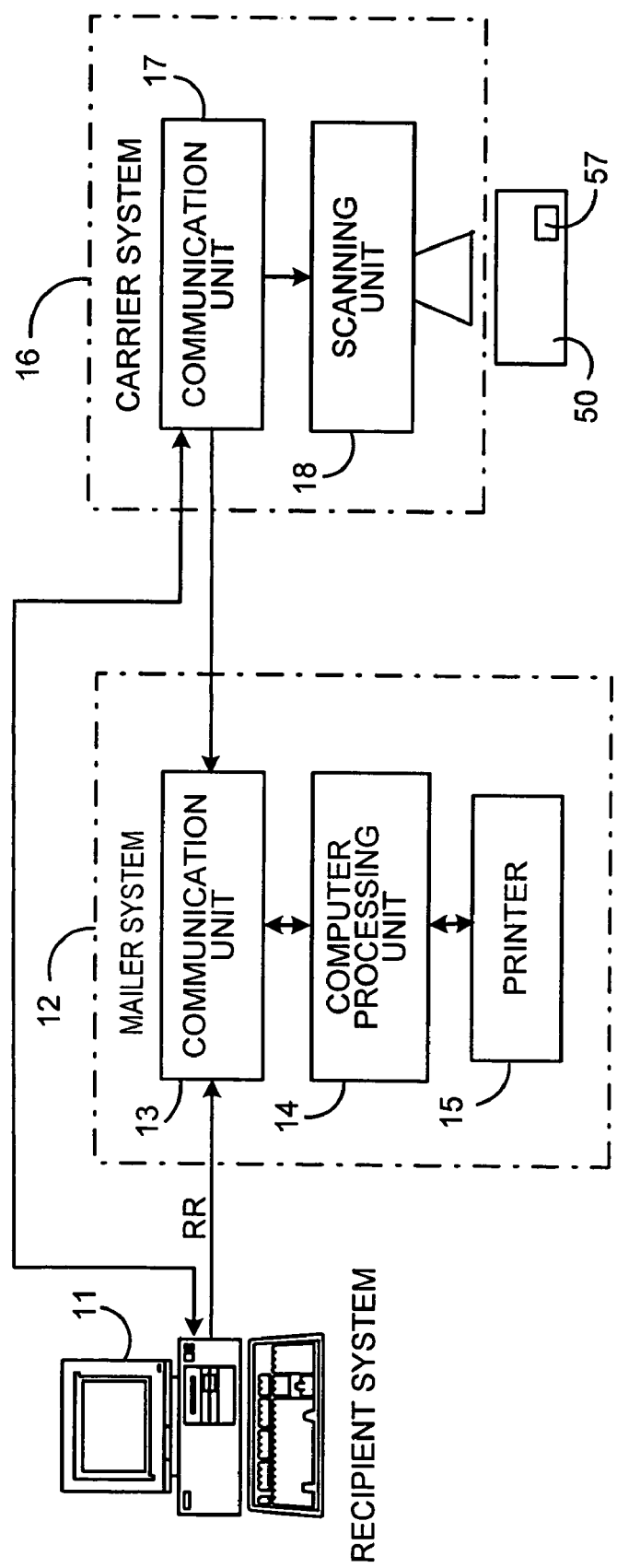
FIG. 1 is a block diagram of a system for creating, processing and delivery of mail items that embodies the present invention.

Referring now to the drawings in detail and more particularly to FIG. 1, the reference character 11 represents a recipient computer system that is coupled to a public communication network, such as the Internet, telephone network, facsimile machine, etc. Computer 11 has a unique and identifiable electronic address, i.e., e-mail address, IP address. A telephone or facsimile machine that is connected to a communication network would have a unique telephone number or facsimile number. Electronic Address or CEA, and a third party required for dispute resolution has its electronic address TTPEA, etc.

Mailer creation system 12 includes a communications unit 13 that is coupled to computer processing unit 14, and a printer 15 that is coupled to computer processing unit 14. Carrier system 16 includes a communication unit 17 and a data capture or scanning unit 18. Computer 11 is coupled to communication unit 13 and communication unit 17, and communication unit 13 is coupled to communication unit 17. Printer 15 will produce mail items, i.e., mail piece 50, containing a Recipient Request Transporter (RRT) 57 (which is described in the description of FIG. 2). RRT 57 will be read by scanning unit 18.

The process of the present invention begins when a first entity "recipient" (such as business or a consumer) decides to order merchandise or request a document from another second entity "mailer" or "sender". The merchandise or a document is referred to as "mail item". It is assumed that the mail item has a value (meaning monetary, legal or time value or any combination of such values) to both the mailer and the recipient and, therefore, it is desirable at least to achieve reasonable assurances of mail item delivery to its intended recipient. The placing of an order (or a request for a document to be sent by the mailer) by the recipient can take any desirable form, for example, through the Internet (by accessing the merchant's web site), by telephone, by fax, by physical mail using pre-printed order forms, or in person by communicating required information orally.

It also should be noted that: (1) recipient has means to communicate his/her REA together with his/her service delivery process preferences (in a codified form or a common plain language) to both mailer and carrier; and shall refer to the information containing recipient's process preferences and his/her REA as Recipient's Request or RR; and (2) mailer has means to receive RR from the recipient and transform RR into machine-readable (and human-readable if needed) information that can be presented on the mail item. This means that mailer, for example, can convert RR to a computerized file that can be printed in a machine/human-readable form on a label that can be attached to the mail item or can be imprinted directly on the mail item. The human/machine-readable form can be a two-dimensional bar code with at least some information repeated in a human-readable form or an RFID tag or any other suitable form, for example, a symbol imprinted with nano-technology processed ink with a large information capacity. We shall refer below to the information physically presented on the mail item and containing RR as Recipient's Request Transporter or RRT. It should be noted that the situation with the mailer is symmetrical to the situation with the recipient in a sense that the mailer can also create a mailer's request MR containing its own electronic address MEA and request for various event information from both the carrier and the recipient;

Carrier has means to capture RRT off the mail piece at different locations and times during mail item processing and delivery and execute instruction contained in the RRT or otherwise act on the RRT information. In practice, this means, for example, that the carrier has means to scan RRT and send scanned information with or without further processing to either REA or MEA, or to TTPEA or all of them.

As it was mentioned, the recipient begins the process of the present invention by creating recipient's request or RR. This request can contain the following information:

1. Description of the merchandise or document or any other item that recipient is requesting to be shipped or mailed by the mailer. This description is sufficient to uniquely identify such merchandise, document and item for the mailer who is in possession of such item. For simplicity, we shall refer to this description as Merchandise Description or MDST. It should be expressly noted that the present invention does not impose any restriction on the type of merchandise or its description except its uniqueness, so that the mailer may find such merchandise (or document) in its warehouses or archives without any ambiguity. An example of MDST is ordering a hat from a clothing distributor such as L. L. Bean. It may contain mailer's internal code for a desired hat style (e.g., HY2376), size (e.g., 7.5), color (e.g., GRN), etc.

2. REA (Recipient's Electronic Address)

3. Recipient-assigned unique identifier for the requested merchandise that meets MDST. For example, such identifier may be LLB001 indicating to recipient and possibly its information technology system that the ordered merchandise is from L. L. Bean, and it is the first merchandise ordered from this mail order house.

The Recipient-Assigned Unique Identifier for the requested merchandise will be referred to as RAUI. The RAUI may contain MDST, date of order as one of its parts or some other information helpful in computerized or human processing of the data that will be received from the carrier. It is important to note here that RAUI together with REA represent globally unique identifier for the mail item.

4. Recipient-defined preferences for mail item processing and delivery that define how recipient would want to have mail item processed by the mailer and the carrier (or carriers if more than one carrier is going to be involved, for example, in the case of cross-border mail). Most important examples of the recipient-defined preferences for mail item processing and delivery are instructions to the carrier such as when the mail item should be delivered to recipient's address (for example after 6:00 PM), where it should be delivered (for example at the back porch) or Poste Restante (meaning that the mail item should be left at carrier's delivery office for pick up by the mailer). Other examples may include instructions to avoid sending the mail item through certain facilities (e.g., known to be more prone to theft) or instructions to charge custom fees directly from a certain specified bank account. Most importantly, the carrier notifies the recipient (about all events required by recipient) by using REA. This means that the carrier, for example, can send an automatically generated e-mail message to the recipient's computer about arrival of the mail item at carrier's delivery office nearest to the recipient's physical address, and, in the absence of any explicit delivery instructions from the recipients may advise the recipients about delivery time period according to normal schedules.

The type and number of preferences are limited only by practical limitations of representing such instructions physically on the mail item (if this is necessary) and the "vocabulary" of coded preferences. It should be expressly noted that it is not necessary to represent recipient-defined preferences for mail item processing and delivery on the mail item itself. The required functionality can also be achieved by putting all preferences in an electronic data base indexed by REA and RDUI and making it accessible to all required parties (e.g., mailer, carrier, TTP). However, in the preferred embodiment, the physical representation of instructions on the mail item is particularly effective, because it does not require any additional data base management.

We shall refer to Recipient-Defined Preferences for Mail Item Processing and Delivery as RDPfD.

5. (Optionally) charge account where charges for shipping and handling can be settled between mailer, recipient and carrier. We shall refer to this item as Charging Information or CI.

Figure 2:
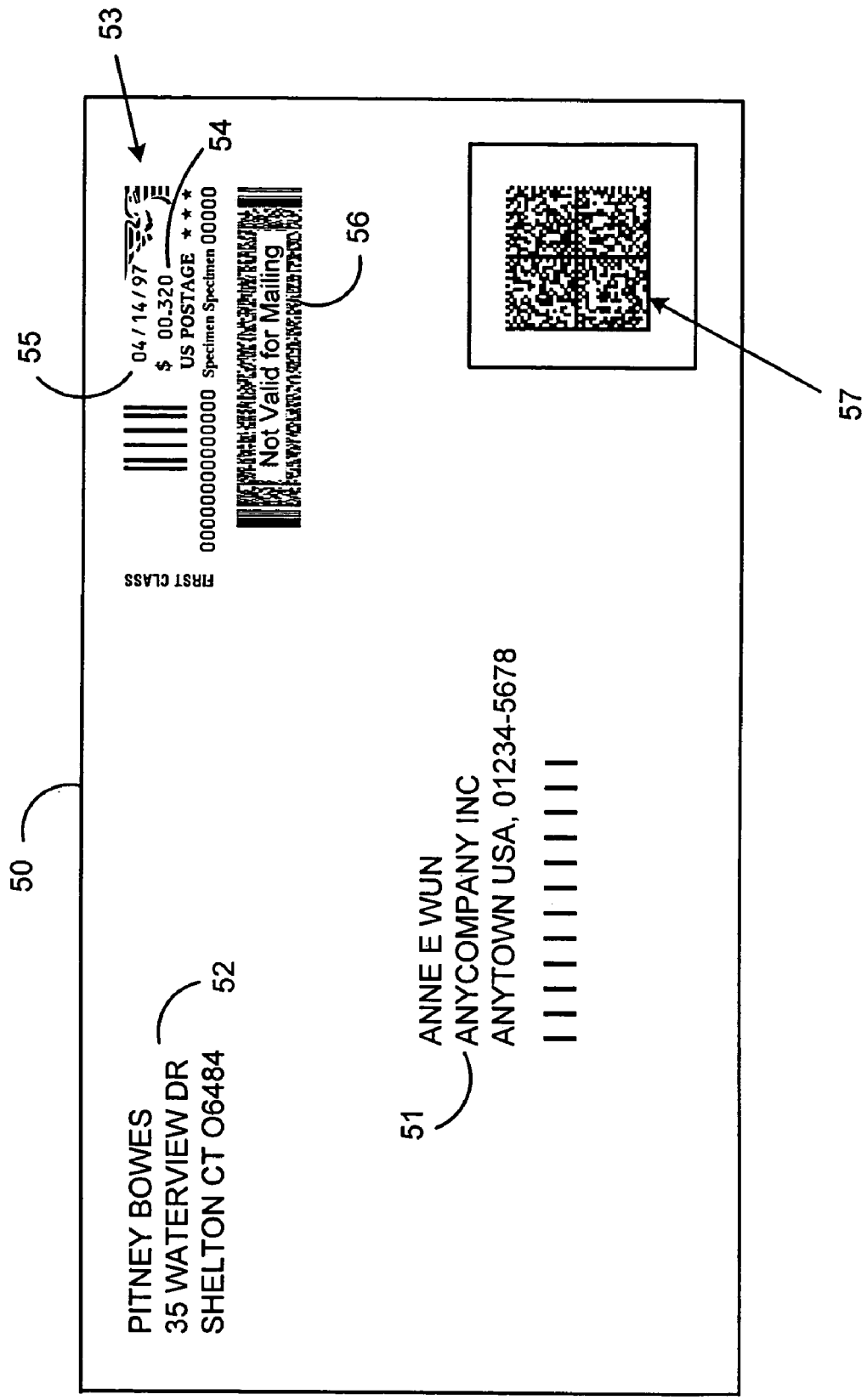
FIG. 2 is a graphic representation of a mail item printed by the system shown in FIG. 1 and includes a mail item identifier and recipient's delivery preferences.

FIG. 2 is a graphic representation of mail item 50 printed by the system shown in FIG. 1 and includes a mail item identifier and recipient's delivery preferences. Mail piece 50 has a recipient address field 51 and a sender address field 52. A postal indicia 53 that was made by an electronic meter is affixed to mail piece 50. Indicia 53 contains a dollar amount 54; the date 55 that postal indicia 53 was affixed to mail piece 50; and a two-dimensional bar code 56. A Recipient Request Transporter 57 is also affixed to mail item 50. Transporter 57 is a physical representation of the recipient's request, which will be more fully described in the description of FIG. 3. Transporter 57 is shown in the form of a two-dimensional bar code, also known as a data matrix code. It will be obvious to one skilled in the art that transporter 57 may take the form of alphanumeric characters or a radio frequency identification tag.

Figure 3A:
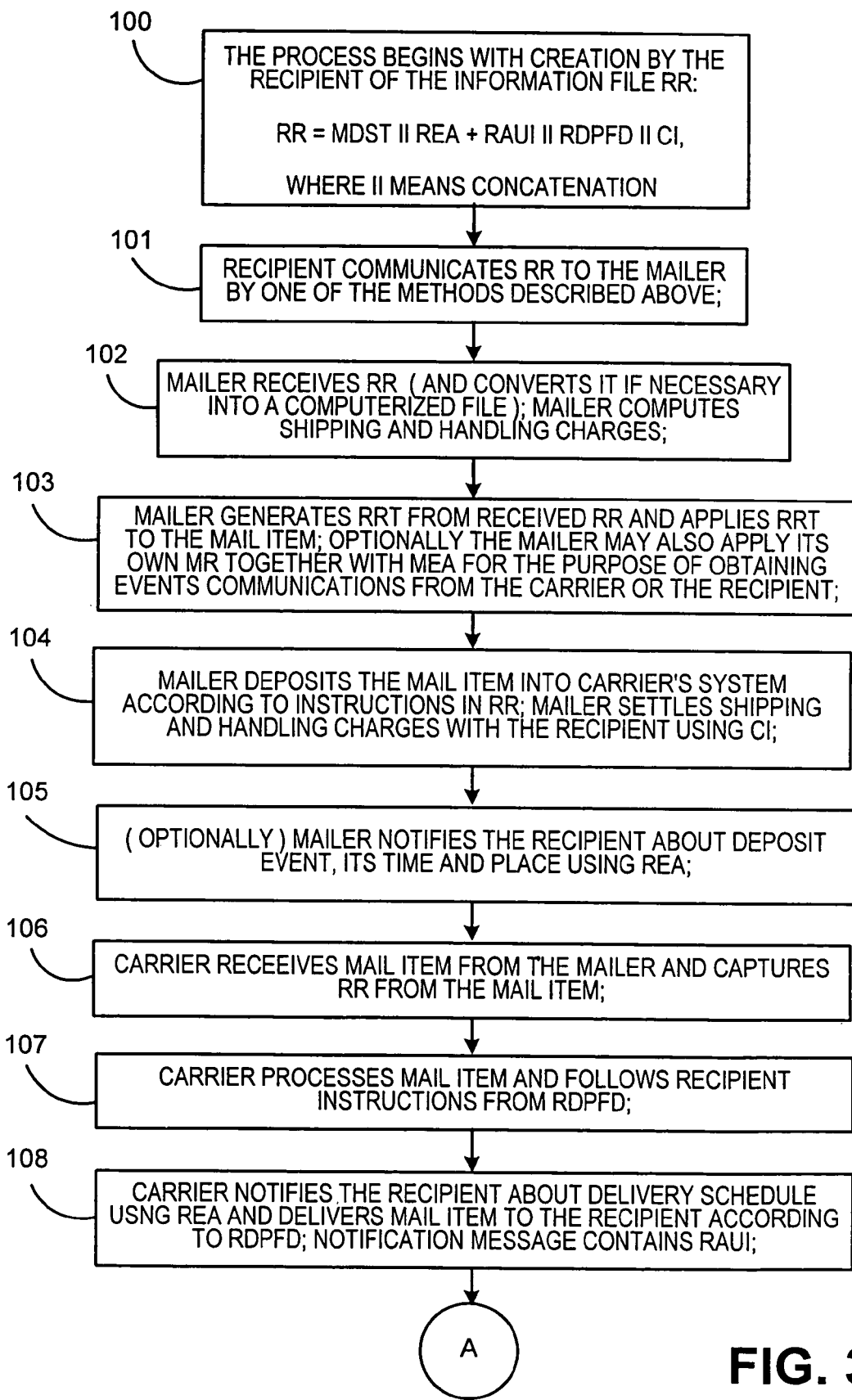
FIG. 3 is a flow chart of a process for creation of a mail item, and of a recipient and sender's notification process.
Figure 3B:
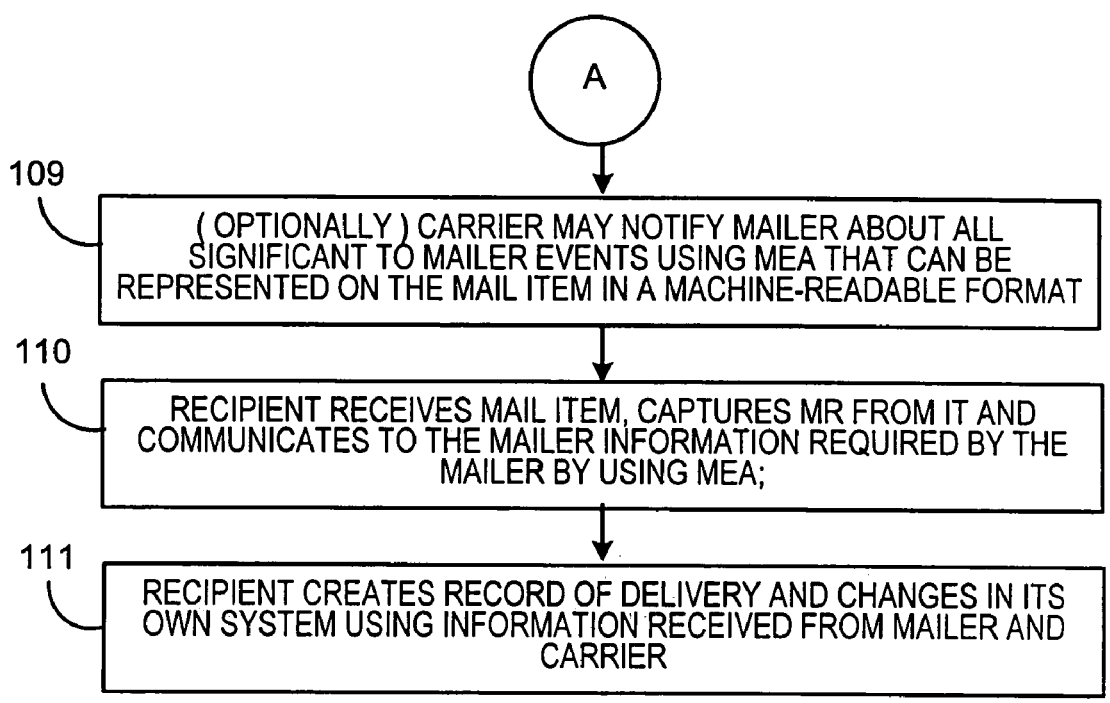

FIG. 3 is a flow chart of a process for creation of mail item 50, and of a recipient and sender's notification process. The process begins in step 100 with the creation by the recipient of the recipient's request, i.e., the information file RR:

$$RR = MDST \| REA + RAUI \| RDPfD \| CI,$$

where | means concatenation, i.e., the tacking of two or more separately located things and placing them side by side so that they may be treated as one thing. The next step in the process is step 101 where the Recipient communicates RR to the mailer by one of the methods described above.

Then the process goes to step 102 where the mailer receives RR (and converts it if necessary into a computerized file). The mailer also computes the shipping and handling charges. Now in step 103 the mailer generates RRT from received RR and applies RRT to the mail item. Optionally, the mailer may also apply its own MR together with MEA for the purpose of obtaining events communications from the carrier or the recipient. At this point, the process goes to step 104 where the mailer deposits the mail item into carrier's system according to instructions in RR. The mailer also settles shipping and handling charges with the recipient using CI. Then in step 105 (optionally), the mailer notifies the recipient about the deposit event, its time and place using REA.

Next in step 106, the carrier receives the mail item from the mailer and captures RR from the mail item. Then in step 107, the carrier processes the mail item and follows recipient's instructions from RDPfD. Now in step 108, the carrier notifies the recipient about delivery schedule using REA and delivers the mail item to the recipient according to RDPfD. The notification message contains RAUI. Next in step 109, (optionally), the carrier may notify the mailer about all significant mailer events using MEA that can be represented on the mail item in a machine-readable format. Next in step 110, the recipient receives the mail item, captures MR from the mail item and communicates to the mailer information required by the mailer by using MEA. Then in step 111, the recipient creates a record of delivery and charges in its own IT system using information received from the mailer and the carrier.

It should be noted that all described services and improvements can be implemented with almost infinite variety of nuances that are entirely within the spirit and in step 111, the recipient creates a record of delivery and charges in its own IT system using information received from the mailer and the carrier.

It should be noted that all described services and improvements can be implemented with almost infinite variety of nuances that are entirely within the spirit and the scope of the present invention. New carrier services possible with the system and method of the present invention can be charged to either recipient or mailer or both. Significantly, the system of present invention allows for automated accounting for the charges both within and outside (by carrier) mail item generation system as well within recipient's information technology system. Independent accounting by mailer's and recipient's system can be used for reconciliation and dispute resolution.

It should also be noted that the method of present invention avoids using physical cards notifying recipients about unsuccessful delivery attempts that are common in many contemporary carrier systems. This is done by executing recipient's instructions RDPfD, for example, leaving mail item either in recipient's controlled receptacle or other specified by the recipient place. Thus, the method of the present invention delivers significant convenience and cost reduction to all parties involved in mail communication system.

The above specification describes a new and improved mailing and logistics method that enables a recipient to select the manner in which the recipient ordered item will be delivered and processed. It is realized that the above description

What is claimed is:

1. A method for tracking and notification of a recipient initiated mail item being delivered to a recipient address, the method comprising:
   (a) selecting by the recipient a mailer-defined description of an item of value that is in the possession of the mailer and is to be delivered to the recipient address;
   (b) selecting an electronic address of the recipient;
   (c) creating by the recipient a unique identifier for the item of value;
   (d) creating a description of recipient's delivery preferences that includes where the mail item should be delivered at the recipient's address;
   (e) combining, by a processing device associated with a recipient system, the information selected and created in steps A-D in an information record;
   (f) communicating the information record to from the recipient system to a mailer system that includes a mailer processing device;
   (g) creating, by the mailer processing device, a physical representation of the information record and printing, by a printing device, the physical representation of the information record;
   (h) applying the physical representation of the information record to a mail item;
   (i) capturing, by a scanning device, information from the physical representation of the information record within a carrier system;
   (j) creating location information regarding the presence of the mail item at a specified location within the carrier system; and
   (k) communicating the captured information and location information to the recipient and to the mailer.

2. The method claimed in claim 1, further including the step of: creating information for handling of the mail item for a third party.

3. The method claimed in claim 2, wherein the third party is a Governmental Customs Office.

4. The method claimed in claim 2, wherein the third party is an escrow agent.

5. The method claimed in claim 1, wherein the description of the item is uniquely indicative of the item.

6. The method claimed in claim 1, wherein the identifier is known by the recipient system.

7. The method claimed in claim 6, wherein the processing device of the recipient system uses the identifier to integrate information from the carrier system to internal applications of the recipient system.

8. The method claimed in claim 1, wherein the location information includes the date and time the mail item is at the specified location.

9. The method claimed in claim 1, wherein the location information includes the date and time the mail item is delivered to the recipient address.

10. The method claimed in claim 1, wherein the captured information is communicated to the mailer via e-mail.

11. The method claimed in claim 1, wherein the captured information is communicated to the recipient via e-mail.

12. The method claimed in claims 1, wherein the recipient delivery preferences further includes when the mail item should be delivered to the recipient address.

13. The method claimed in claim 1, wherein the recipient delivered preferences further includes avoiding sending of the mail item through certain facilities.

14. The method claimed in claim 1, wherein the recipient delivered preferences further includes charging customs fees directly to a specified bank account.

* * * * *